A. W. HAZZARD.
Artificial Fish for Trolling-Hooks.

No. 149,123. Patented March 31, 1874.

Witnesses.
Aaron R. McLean.
C. Goundry Bennett.

Inventor:
Arnold W. Hazzard.
By C. W. Bennett, atty.

AM. PHOTO-LITHOGRAPHIC CO. N.Y. (OSBORNE'S PROCESS)

UNITED STATES PATENT OFFICE.

ARNOLD W. HAZZARD, OF SENECA FALLS, NEW YORK.

IMPROVEMENT IN ARTIFICIAL FISH FOR TROLLING-HOOKS.

Specification forming part of Letters Patent No. 149,123, dated March 31, 1874; application filed July 16, 1873.

*To all whom it may concern:*

Be it known that I, ARNOLD W. HAZZARD, of the village of Seneca Falls, in the county of Seneca and State of New York, have invented a new and useful Improvement in Artificial Fish for Trolling-Hooks; and I do hereby declare that the following is a full, clear, and exact description of the same, reference being had to the annexed drawings making part of this specification, in which—

Figure 1:
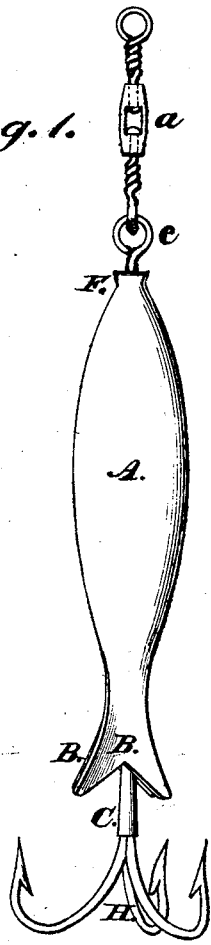
Figure 2:
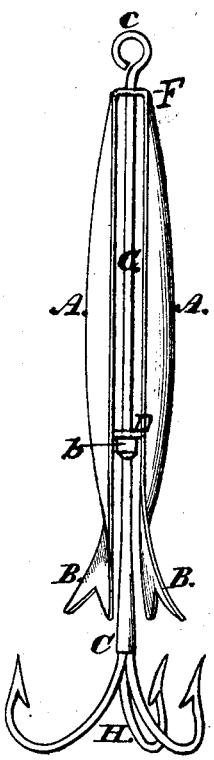
Figure 3:
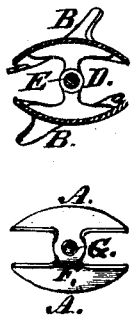

Figure 1 is a plan view of the artificial bait and hook. Fig. 2 is a longitudinal section. Fig. 3 is a cross-section, showing the mode of securing the hook.

The same letters are employed in all the figures in the indication of parts which are identical.

A A are the sides of the artificial fish. B B are the flanges by means of which the revolution of the artificial fish or bait is governed. C is the shaft to which the hook or hooks are attached. D is a connecting-bar or stay, by means of which the two sides of the artificial fish are kept in proper position. E is a round hole in the connecting-bar or stay, through which the shaft C passes. F is the head of the artificial fish, connecting the sides A A, and having a round hole, G, through which the shaft C passes, to be attached to a swivel fastened to the ordinary fishing-lines. H are the hooks attached to the shaft C.

The nature and object of my invention are to provide a hook with an artificial bait attached, for trolling and other modes of fishing, which will work to all appearances like a natural fish, and be less liable to frighten fish than those now in use, thereby securing more certain success, and at the same time provide a hook of simple construction, of slight expense, and durable, which can easily be arranged so as to revolve while in the water at any desirable speed.

To enable others skilled in the art to construct and use my invention, I will proceed more particularly to describe it.

I make of German silver, or any desirable metal which can be silver-plated, a piece representing the two sides of a fish, connected by a small arm at the end, representing the head. I then bend the same together, so as to make the two sides correspond, as shown by Fig. 1, leaving an opening between the two sides sufficient to correspond with the side of the artificial fish desired, so that the sides, when attached by the cross-bar or stay D, will represent, as near as possible, the proper size of the fish, in width as well as in length. This cross-bar or stay D is placed at about two-thirds of the length of the artificial fish or bait from the head, and is intended to strengthen the fish and to steady the shaft C. In the arm F, connecting the sides of the fish, I make an opening for the passage of the shaft C. The shaft C, passing through the opening F and the cross-bar or stay D, is secured at its forward end, by a spring-loop or other device, to the swivel, to which the line is fastened, as shown by *a*, and at the other end of the shaft I fix securely, by any proper method, one or more fish-hooks. By means of a shoulder, *b*, on the shaft, back of the cross-bar D, the hook is prevented from being drawn against the flanges B, and is kept in its proper place, while the arrangement of the spring-loop *c*, to secure the shaft C to the swivel, prevents the shaft from being drawn back from the position represented in the drawing, thus enabling the sides A A to revolve freely. To increase the revolutions of the sides A A of the artificial fish or bait when in the water, the flanges B B, which represent the tail of the fish, can be bent as desired, the bending outward increasing the revolutions, and inward, decreasing the same. By painting the inside of the flanges B B, the same is more attractive to fish, and different colors are to be used for different kinds of fish, such as red for bass, perch, &c.; white for trout, &c., as is the custom of fishermen.

The artificial fish or bait, as above described, when thrown into the water attached by the swivel to an ordinary line, will, by being drawn or trolled in the water, commence to revolve, the hooks attached to the shaft remaining comparatively stationary. The artificial fish, while revolving, has the appearance of a live fish in motion, the shaft C, to which the hook is attached, appearing at all times through the opening between the sides A A, like the back of a live fish, while the water within the sides A A has the exact appearance of the peculiar color of nearly every variety of fish when in motion, and thus is better calculated than any other hook or bait known to attract the fish. This can easily be seen by looking through the opening of the fish and revolving the sides A A.

In ordinary trolling, the line is tightened or slackened by the action of the arm of the fisherman, this action, operating upon my artificial fish, giving it the appearance of dashing through the water when the line is tightened, and remaining nearly stationary when the line is slackened, and thus having a tendency to attract the fish more than if at all times in steady motion. This is deemed a very desirable improvement over ordinary artificial fish or bait.

It is obvious that this improvement can also be used for still-fishing, as the usual raising and lowering of the arm, and consequently the bait in the water, will cause the artificial fish to revolve one way in being raised, and the other way in being lowered, and otherwise the same as in trolling. In this it is superior to all ordinary spoon-hooks, or artificial-fish hooks, inasmuch as it revolves as it is lowered or raised in the water, all others being stationary while being lowered in the water.

It is believed that the particular mode by which I represent the opening between the sides of a fish, with the shaft of the hook arranged as above stated, is the most perfect representation of a live fish, and, inasmuch as it is so, it is superior to any other artificial bait in use.

Having thus described my invention, what I claim, and desire to secure by Letters Patent, is as follows, viz:

1. An artificial fish having the sides A A, the connecting-arm F, and cross-bar D, in combination with the shaft C and hooks H, when said parts are constructed and arranged substantially as and for the purpose described.

2. The sides A, flanges B, shaft C, and hooks H, all arranged to operate substantially as and for the purpose described.

Dated this 10th day of July, 1873.

ARNOLD W. HAZZARD.

Witnesses:
L. EGLESTON,
W. P. SPRAGUE.